US008145513B2

(12) United States Patent
Villalobos et al.

(10) Patent No.: US 8,145,513 B2
(45) Date of Patent: Mar. 27, 2012

(54) HAUL ROAD MAINTENANCE MANAGEMENT SYSTEM

(75) Inventors: Oscar Ernesto Villalobos, Melbourne (AU); Peter John Brewster, Brighton East (AU)

(73) Assignee: Caterpillar Inc., Peoria, IL (US)

( * ) Notice: Subject to any disclaimer, the term of this patent is extended or adjusted under 35 U.S.C. 154(b) by 1547 days.

(21) Appl. No.: 11/529,515

(22) Filed: Sep. 29, 2006

(65) Prior Publication Data
US 2008/0082347 A1    Apr. 3, 2008

(51) Int. Cl.
*G06Q 10/00*    (2006.01)
(52) U.S. Cl. .................................. 705/7.11; 705/7.12
(58) Field of Classification Search ............ 705/8, 7.11, 705/7.12; 701/1, 29
See application file for complete search history.

(56) References Cited

U.S. PATENT DOCUMENTS

| | | | |
|---|---|---|---|
| 5,526,266 A | 6/1996 | Rutan et al. | |
| 5,531,122 A * | 7/1996 | Chatham et al. | 73/760 |
| 5,737,215 A | 4/1998 | Schricker et al. | |
| 5,808,907 A | 9/1998 | Shetty et al. | |
| 5,817,936 A | 10/1998 | Schricker | |
| 5,848,371 A | 12/1998 | Creger | |
| 5,961,560 A | 10/1999 | Kemner | |
| 6,721,680 B2 | 4/2004 | Sorrells et al. | |
| 6,757,604 B2 | 6/2004 | Carlson et al. | |
| 6,839,638 B2 | 1/2005 | Lueschow et al. | |
| 6,842,680 B2 | 1/2005 | Doddek et al. | |
| 6,858,809 B2 | 2/2005 | Bender | |
| 2002/0016655 A1 * | 2/2002 | Joao | 701/35 |
| 2004/0122618 A1 | 6/2004 | Suzuki et al. | |
| 2005/0145018 A1 * | 7/2005 | Sabata et al. | 73/49.1 |
| 2006/0155447 A1 | 7/2006 | Uken et al. | |
| 2007/0078570 A1 * | 4/2007 | Dai et al. | 701/1 |
| 2007/0112475 A1 * | 5/2007 | Koebler et al. | 701/1 |
| 2010/0073124 A1 * | 3/2010 | Mahalingaiah et al. | 340/5.1 |

OTHER PUBLICATIONS

An integarted haul road design system to reduce cost per tonne hauled. Roger thompson, alex Visser, May 2002.*
An introduction to the integrated design of surface mine haul roads. Roger Thompson, alex Visser, 1997.*
Guidelines for Mine Haul Road Design Dwayne D. Tannant & Bruce Regensburg School of Mining and Petroleum Engineering Department of Civil and Environmental Engineering University of Alberta 2001.*
Intelligent Pothole Repair Vehicle A Thesis by Ruzbeh Adi Minocher Homji Aug. 2005.*
Roger J. Thompson and Alex T. Visser, "Management of Unpaved Road Networks on Opencast Mines," Transportation Research Record (TRR) 1652, vol. 2, Transportation Research Board, National Academy Press, Washington, D.C., USA, 1999, pp. 217-224.
R. J. Thompson and A. T. Visser, "A mechanistic structural design procedure for surface mine haul roads," International Journal of Surface Mining, Reclamation and Environment 11 (1997): 121-128.

(Continued)

*Primary Examiner* — William Rankins
(74) *Attorney, Agent, or Firm* — Finnegan, Henderson, Farabow, Garrett & Dunner LLP

(57) ABSTRACT

A haul road maintenance management system has a vehicle diagnostic module located onboard a haul vehicle and a database, which stores historical repair data relating to the haul vehicle. The haul road maintenance management system also has a controller in communication with the vehicle diagnostic module and the database. The controller is configured to analyze data from the vehicle diagnostic module and the database, and recommend road maintenance in response to the analysis.

20 Claims, 3 Drawing Sheets

OTHER PUBLICATIONS

R. J. Thompson, and A. T. Visser, "The functional design of surface mine haul roads," The Journal of South African Institute of Mining and Metallurgy, vol. 100, No. 3, May/Jun. 2000, pp. 169-180.

R. J. Thompson and A. T. Visser, "Towards a mechanistic structural design method for surface mine haul roads," Journal of South African Institute of Civil Engineering, 1996, vol. 38, No. 2, pp. 13-21.

Roger J. Thompson and Alex T. Visser, "An integrated Haul Road Design System to Reduce Cost per Tonne Hauled," World Mining Equipment Haulage 2000 Conference, May 19-22, 2002, Tucson, Arizona, U.S.A., pp. 1-14.

R. J. Thompson and A. T. Visser, "An introduction to the integrated design of surface mine haul roads," International Journal of Surface Mining, Reclamation and Environment, 11 (1997): 115-120.

Cannon, "System and Method of Monitoring Machine Performance," U.S. Appl. No. 11/092,612, filed Mar. 30, 2005 (22 pages).

* cited by examiner

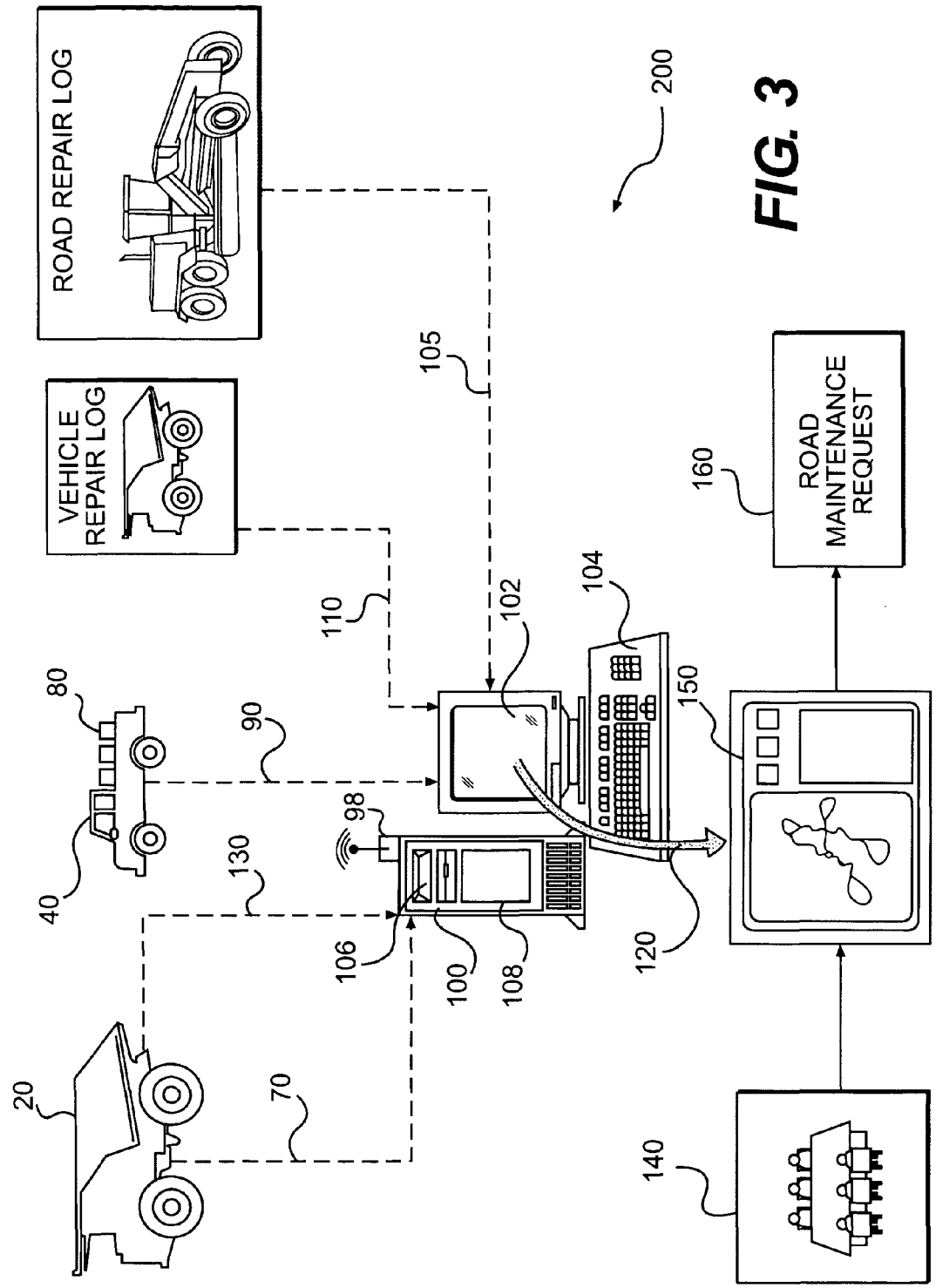

HAUL ROAD MAINTENANCE MANAGEMENT SYSTEM

TECHNICAL FIELD

The present disclosure is directed to a haul road maintenance management system and, more particularly, to a method and a system for managing the maintenance of haul roads.

BACKGROUND

Mining and large scale excavating operations require fleets of haul vehicles to transport excavated material such as ore or overburden from an area of excavation over roads to a predetermined destination. For such an operation to be profitable the fleet of haul vehicles must be efficiently operated. Efficient operation of these vehicles is affected by the quality of the roads over which they travel. For example, the grade and character of the roads in combination with the size of vehicle payload have direct effects on cycle time, vehicle health, and fuel usage which, in turn, directly affect productivity and profitability of the mining and excavating operations. During the past 30 years, haul vehicles have developed from haul trucks capable of moving 20 tons of material to haul trucks that transport more than 350 tons. Increasing payload sizes exert large stresses on the roads over which the haul vehicles operate. Large stresses on the roads increase the propensity of damage to the roads and the haul trucks that operate on them.

Traditionally, maintenance of the roads at a mining or excavating site has been highly reactive. That is, the road defects are repaired as they occur, with little planning or scheduling of repair events. This ad-hoc road maintenance approach is inefficient and increases costs by over or under maintenance of the roads. For example, in some instances damage on a stretch of the road is allowed to accrue until reaching a point when travel along the road becomes dangerous. Repair at this stage is expensive, both in terms of lost productivity and inability to schedule the machines and labor required for the repair at an opportune time. In other instances, a preventive maintenance schedule is slavishly followed without regard to the effect of the damage on the operation of the mine. In this case, too much money and effort may be spent on unnecessary road maintenance. As the trend of increasing payload size continues, a holistic approach to manage the maintenance of haul roads is desired to keep operational costs down.

One approach at improving road conditions is disclosed in U.S. Pat. No. 5,817,936 issued to Schricker (the '936 patent) on Oct. 6, 1998. In particular, the '936 patent discloses detecting an abnormal road surface condition by sensing machine parameters as a mobile machine traverses a segment of the road. These parameters are then used to calculate a resistance factor for the road segment. The calculated resistance factor is compared with an average resistance factor and an abnormal condition of the road surface can thus be detected. If an abnormal condition is detected, the road is repaired to correct the condition.

Although the method of the '936 patent may sufficiently detect an abnormal surface condition of the road, it does not perform a holistic economic analysis using all available information of road condition and its impact on vehicles that operate on them to provide an optimized road maintenance approach. Rather, the method disclosed in the '936 patent is limited to detection of road damage only, followed by routine reactive repair when resources become available.

The present disclosure is directed to overcoming one or more of the problems set forth above.

SUMMARY OF THE INVENTION

In accordance with one aspect, the present disclosure is directed toward a haul road maintenance management system. The haul road maintenance management system includes a vehicle diagnostic module located onboard a haul vehicle, and a database which stores historical repair data of the haul vehicles. The haul road maintenance management system also includes a controller in communication with the vehicle diagnostic module and the database. The controller is configured to analyze data from the vehicle diagnostic module and the database. The controller is also configured to recommend road maintenance in response to the analysis.

According to another aspect, the present disclosure is directed toward a method of haul road maintenance management. The method includes receiving vehicle performance data, road condition data, and vehicle repair data. The method further includes analyzing the vehicle performance data, the road condition data, and the vehicle repair data, and recommending road maintenance based on the analysis.

BRIEF DESCRIPTION OF THE DRAWINGS

FIG. 3 is a schematic illustration of an exemplary disclosed haul road maintenance management system for use at the worksite of FIG. 1.

DETAILED DESCRIPTION

Figure 1:
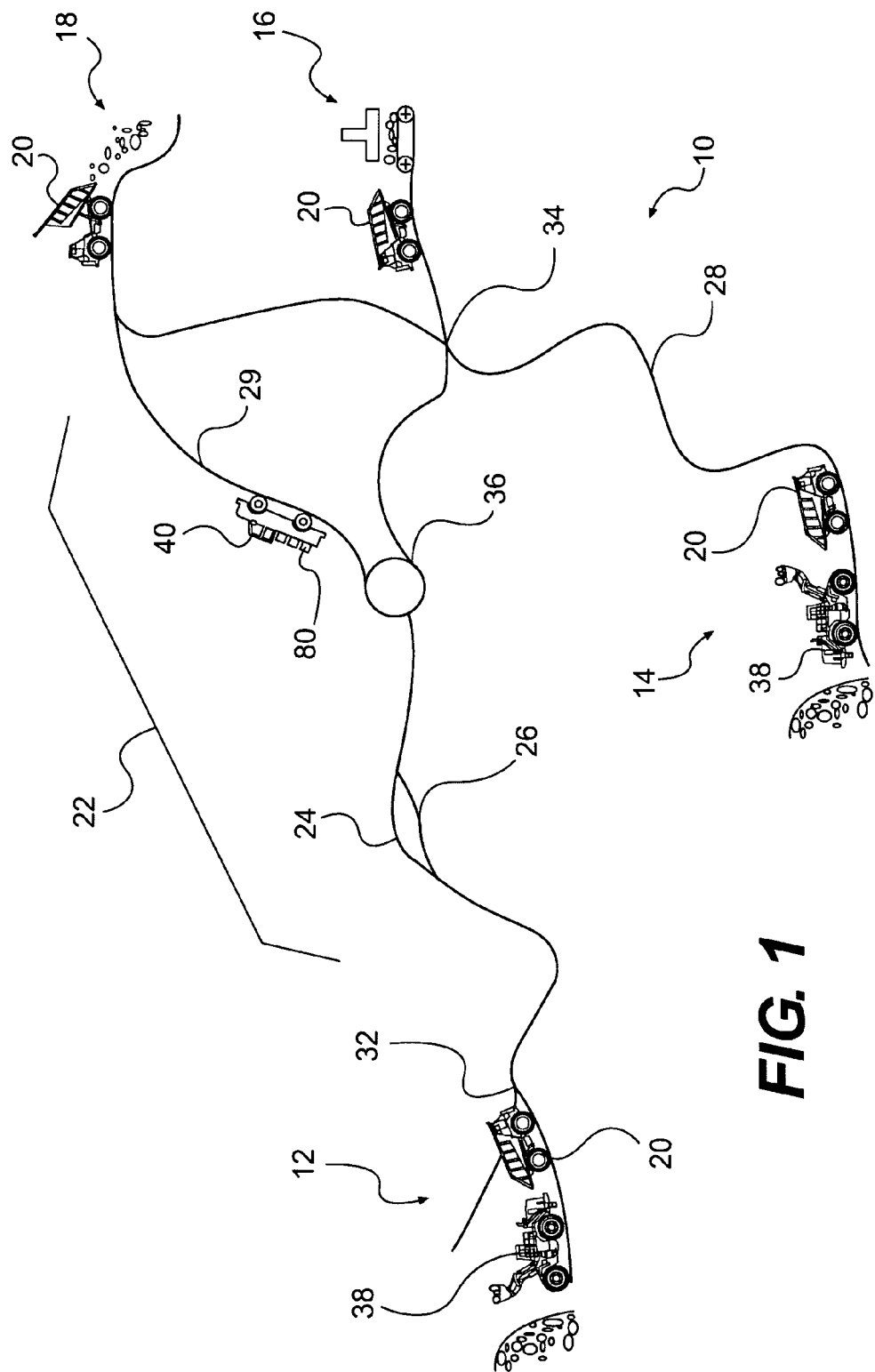
FIG. 1 is a schematic and diagrammatic representation of an exemplary disclosed worksite.

FIG. 1 shows an open pit mine operation 10 including an excavation site 12, an excavation site 14, an ore processing site 16 and a dump point 18. The excavation sites 12 and 14 may be connected to the processing site 16 and the dump point 18 by a haul road 22. Haul road 22 refers to a network of roads that interconnect different locations within the open pit mine operation 10. For example, haul road 22 may include road segments 24, 26, 28 and 29. These road segments may be inclined, declined, substantially level, or any combination of these orientations. Haul road intersections such as a "Y" intersection 32, a "+" intersection 34, and a "T" intersection 36 may interconnect the different road segments 24, 26, 28 and 29. As part of the mining function, machines and other vehicles may operate at or between different locations of the mine field operation 10. These machines or vehicles may include loading machines 38, service trucks 40, and haul vehicles 20.

A loading machine 38 refers to any machine that load materials excavated in the mine on to haul vehicles 20. Examples of a loading machine 38 may include a wheel loader, a front shovel, an excavator, an electric cable shovel or any other similar machine. The excavated materials may include ore or overburden. One or more loading machines 38 may operate within the excavation sites 12 and 14 to load excavated materials on the haul vehicles 20.

A service truck 40, such as an on-highway pickup truck or equipment monitoring van, may be utilized to carry personnel and/or road monitoring equipment over the haul road 22. These service trucks 40 may be fitted with different sensing devices 80 to monitor and/or measure the condition of the road 22. These sensing devices 80 could include, for example, high speed profilometers to measure the road surface roughness while traveling over a road segment 24, 26, 28 and 29, cameras to capture actual road condition footage or other visual inspection monitoring devices. Service trucks 40 may also be configured with a recording and/or communication device to record and/or transmit the sensed data.

A haul vehicle 20 refers to any vehicle that may carry the excavated materials between different locations within the open pit mine operation 10. Examples of a haul vehicle 20 may include an articulated truck, an off-highway truck, an on-highway dump truck, a wheel tractor scraper or any other similar vehicle. Laden haul vehicles 20 may carry overburden from areas of excavation within the excavation sites 12 and 14 along the haul road 22 to the dump site 18. Laden haul vehicles 20 may also carry ore from the excavation sites 12 and 14 to the processing site 16 along haul road 22. Empty haul vehicles 20 may return to the excavation sites 12, 14 along either of these routes.

Figure 2:
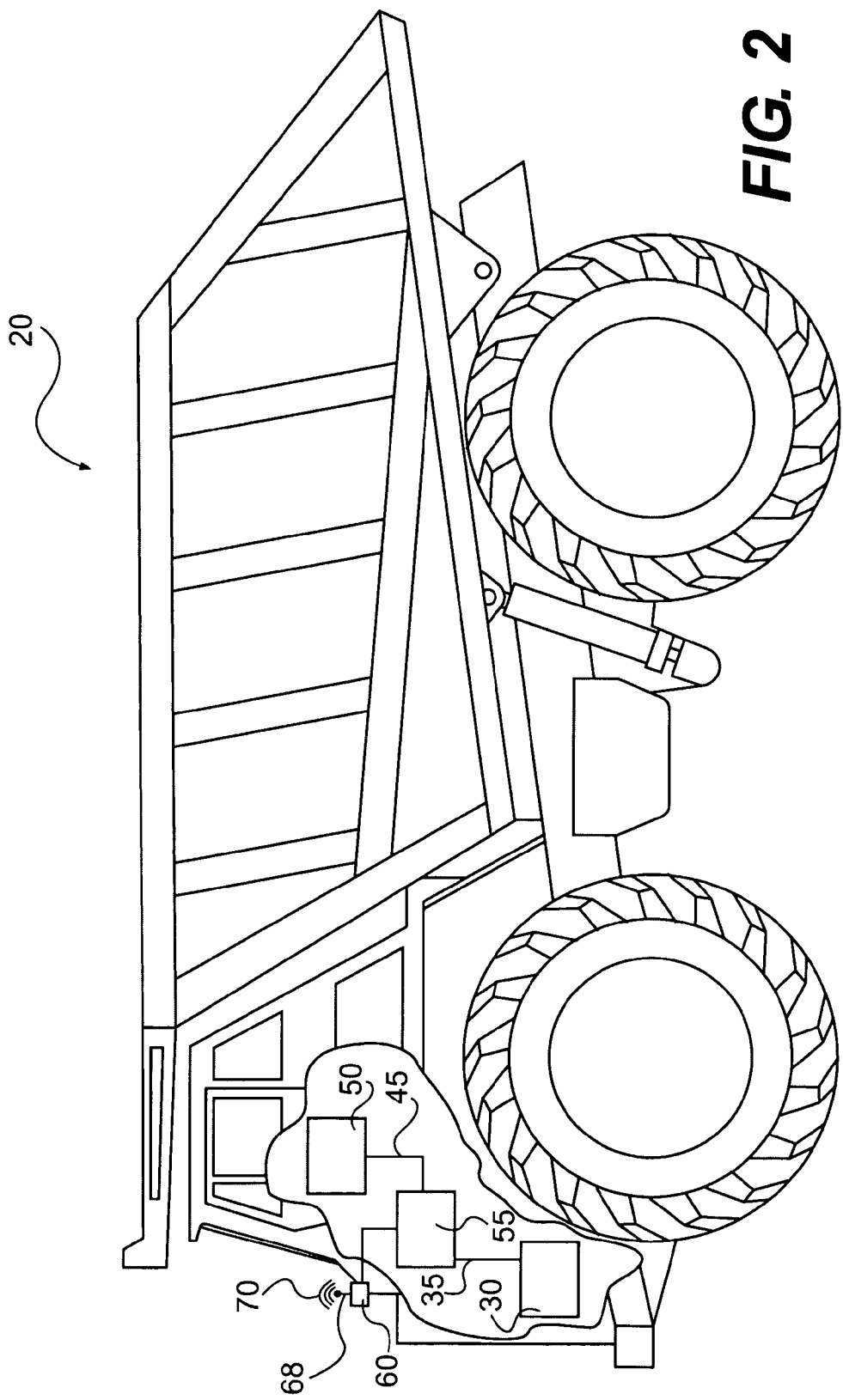
FIG. 2 is a diagrammatic illustration of an exemplary haul vehicle that operates on the worksite of FIG. 1.

FIG. 2 shows one exemplary haul vehicle 20 that may traverse the haul road 22. The haul vehicle 20 may record and transmit data while traversing the haul road 22. This data may include haul vehicle diagnostic data 70. Haul vehicle diagnostic data 70 may include data automatically monitored by the vehicle (vehicle data 35) and information observed and input manually by haul vehicle operators (observed data 45).

Haul vehicle 20 may include monitoring means 30 to automatically monitor various vehicle data 35 during its travel between different locations within the open pit mine operation 10. This vehicle data 35 may include vehicle parameters such as, for example, torque at various points along the drive train, rolling resistance of the tires, payload weight, operator gear selection along the haul route, vehicle speed, and suspension cylinder pressure. Vehicle data 35 may also include road parameters such as, for example, the grade of the haul road 22 and the coordinate location of the haul vehicle 20 at a given time. The vehicle data 35 may be monitored by any means known in the art, for instance, by an onboard inclinometer or by GPS receivers that indicate a coordinate location and calculate a change in elevation over a traversed distance. Some vehicle data 35 may be monitored directly, while other data may be derived or calculated from the monitored parameters.

The haul vehicle 20 may also be equipped with operator data logging means 50 for manually recording visually observed data 45. Observed data 45 may include information associated with the physical condition of a road segment 24, 26, 28 or 29 that the operator may observe while operating the haul vehicle 20. For example, observed data 45 may include information regarding a defect in a road segment, such as the type of defect, criticality of the defect, location of the defect, and any special circumstances that increase or decrease the impact of the defect on the haul vehicle 20. The type of defects included in the observed data 45 may be classified into categories such as pot holes, road surface corrugation, rutting, loose material, excessive dustiness, surface cracks, etc. The criticality of the defect may be the operator's sense of the severity of the defect measured on a relative scale used by operators in the open pit mine operation 10. For instance, the severity of a pot hole defect may be scaled from "1" to "5", with "5" referring to a deep pot hole that may cause immediate damage to a haul vehicle 20, and "1" referring to a pothole that is a mere inconvenience. Upon observing a pothole while traversing road segment 24, the operator may record observed data 45 on the operator data logging means 50. This observed data 45 may include "pot hole" as the category of the defect, "2" as the severity of the defect, and "road segment 24" as the location of the defect. Alternatively or additionally, the location of the defect may also be the GPS location of the haul vehicle 20 at the time the defect was observed.

Operator data logging means 50 may be a log book that the operator fills out after a trip or an electronic data logging device located in the operator cab. In some cases, the operator data logging means 50 may automatically combine operator observed data 45 with automatically monitored vehicle data 35. For example, the operator data logging means 50 may combine operator input regarding the type and criticality of a defect with the monitored coordinate location of the haul vehicle 20 at the time the observed data 45 was input to record the coordinate location of the defect.

The haul vehicle 20 may also have a recording module 55 and/or a communicating module 60 for recording and electronically transmitting the monitored and observed vehicle and road condition data. The recording module 55 could include any data storing means, such as a data recorder with a portable recording medium. In such a case, the recorded data may be transferred from the haul vehicle 20 to control system 100 using the portable recording medium. The communication module 60 may include any device that facilitates communication between haul vehicles 20 and a control system 100. The communication module 60 may include hardware and/or software that enable the communication module 60 to send and/or receive data through a wireless communication link 68. It is contemplated that in some situations, the data may be transferred to the control system 100 through a direct data link (not shown) or downloaded from haul vehicle 20 and uploaded to control system 100. It is also contemplated that in some situations, the automatically monitored data may be electronically transmitted, while the observed data 45 may be communicated to the control system 100 by a voice communication device, such as a two-way radio.

FIG. 3 is a schematic illustration of a haul road maintenance management system 200. The haul road maintenance management system 200 may include a control system 100 that receives and processes data from a variety of sources to perform haul road maintenance management.

The control system 100 may include any type of computer or a plurality of computers networked together, which may perform haul road maintenance management. The control system 100 may be located proximate the haulage operation or may be located at a considerable distance remote from the haulage operation, such as a different city or even a different country. It is also contemplated that computers at different locations may be networked together to form the control system 100.

The control system 100 may include among others, a console 102, an input device 104, an input/output means 106, storage media 108, and a communication interface 98. Console 102 may provide a graphics user interface (GUI) to display results and information to operators and other users of the control system 100. Console 102 may be any appropriate type of computer display device or computer monitor. Input device 104 may be provided for operators to input information into the control system 100. Input device 104 may include, for example, a keyboard, a mouse, or other optical or wireless computer input devices. The input/output means 106 may be any type of device configured to read/write information from/to a portable recording medium. Input/output means 106 may include among others, a floppy disk, CD, DVD, or a flash memory read/write device. The input/output means 106 may be provided to transfer data into and out of the control system 100 using a portable recording medium. The storage media 108 could include any means to store data within the control system 100. The storage media 108 may include a hard disk or any other type of data storage means.

The storage media 108 may be used to store a database containing among others, historical road condition and maintenance data, haul vehicle repair and/or maintenance history and haul vehicle performance history. The communication interface 98 may provide communication connections enabling the control system 100 to be accessed remotely through computer networks, and means for data from remote sources to be transferred into and out of the control system 100. The communication interface 98 may contain network connections, data link connections, and antennas configured to receive wireless data.

Data may be transferred to the control system 100 electronically or manually. Electronic transfer of data includes the transfer of data using the wireless capabilities or the data link of the communication interface 98. Data may also be electronically transferred into the control system 100 through a portable recording medium using the input/output means 106. Manually transferring data into the computer system may include communicating data to a control system operator in some manner, who may then manually input the data into the control system 100 by, for example, using the input device 104. The data transferred into the control system 100 may include haul vehicle diagnostic data 70 from haul vehicles 20, haul road monitoring data 90 from service trucks 40, haul vehicle repair data 110 from vehicle repair logs, and road repair equipment data 105 from equipment logs. The transferred data from haul vehicle 20 may also include triggering data 130, which may indicate a road defect that could cause immediate damage to haul vehicle 20.

Haul road monitoring data 90 may also indicate a haul road surface condition, such as a road defect. This data may be collected by service trucks 40 equipped with sensing devices 80 to monitor the condition of the road. These service trucks 40 may traverse the haul road 20 periodically to monitor the road condition. For example, service trucks 40 may traverse the haul road 22 to monitor the surface roughness of the road once every month. This data may supplement haul vehicle diagnostic data 70 obtained by haul vehicles 20 for segments that are frequently traversed by haul vehicles 20. For road segments that are less frequently traversed by haul vehicles 20, the haul road monitoring data 90 may be the only road condition data available. It is also contemplated that haul road monitoring data 90 may include structural, chemical or compositional analysis of the soil of different road segments 24, 26, 28, and 29. The data obtained by these service trucks 40 may be transferred to the control system 100 electronically or manually.

Haul vehicle repair data 110 may include repair and maintenance information associated with haul vehicles 20, service trucks 40, and/or loading machines 38. For example, haul vehicle repair data 110 may include the number and frequency of vehicle tire changes for particular vehicles operating along particular routes. The frequency of tire changes may give an indication of the condition of the road that the haul vehicle 20 operates on. Haul vehicle repair data 110 may be transferred from vehicle repair logs to the control system 100 electronically or manually. If the vehicle repair logs are maintained using a computer system, it may be linked to the control system 100 to transfer the haul vehicle repair data 110 automatically. If, however, the vehicle repair logs are maintained in a book, haul vehicle repair data 110 may be periodically reported to the control system operator for manual input into the control system 100. It is also contemplated that the vehicle repair log may be maintained in a data base of the control system 100, which may be periodically updated. In such a case, haul vehicle repair data 110 may exist within the control system 100.

Road repair equipment data 105 may include information from road repair logs on the availability of road repair equipment, such as motor graders, wheel dozers, etc. It may be transferred to the control system 100 from road repair logs electronically or manually. If the road repair log is maintained using a computer system, it may be linked to the control system 100 to transfer the road repair equipment data 105 electronically. It is also contemplated that the road repair log, like the vehicle repair log, may be maintained in a data base of the control system 100. In such a case, the road repair equipment data 105 may exist within the control system 100.

Triggering data 130 may indicate a road defect that should be repaired immediately. Triggering data 130 may include vehicle diagnostic data 70 that exceeds a preset threshold, and thereby indicates an immediate need for repair. For instance, a category "5" pot hole that may cause a tire to rupture may be set up as triggering data 130, or a road surface roughness that exceeds a preset limit may be set up as a triggering data 130. It is also contemplated that the triggering data is a fixed or variable limit that is set by the control system 100.

The control system 100 may perform analysis on the data and present results 120. These analyses may include an economic analysis of the data to optimize haul road maintenance. For example, the analysis may compute the cost of repair of a road segment 24, 26, 28, 29 if performed immediately and compare it to the cost if the repair is performed after a certain period of time. The analysis may also identify defects that cause the most impact on road performance and overall mining productivity. For example, the analysis may indicate that a road defect on road segment 24 causes the most vehicle damage as compared to other known road defects or increases mine productivity the most. The analysis may also indicate the response of a vehicle operator to a particular road defect and the variation in the responses between different operators to the same road defect. For example, vehicle data 35 may indicate that a haul vehicle 20 uses too low a gear while traversing a particular level segment of the haul road 22. Comparison with observed data 45 from the same time period may indicate whether the low gear was in response to a road damage that the operator observed. Further comparison with historic data from the same road segment, may indicate how different operators responded to the same road defect. These comparisons may also indicate when the defect was first observed and the whether the criticality of the defect (and the response of the haul vehicle 20 to the defect) worsens with time. The analysis may include analysis of vehicle data 35 to identify locations of potential road defects. For example, the control system 100 may analyze the monitored suspension cylinder pressures of haul vehicle 20 to identify abnormalities. These abnormalities may then be taken as an indication of a road defect.

The analysis may also include computation of performance metrics. These performance metrics may include the mean time between failures, mean time to repair, haul road defect-free index, the cost per kilometer of haul vehicle operation and the cost per square meter of haulage road maintenance, age of the reported defects, traffic volumes over haul road segments, rolling resistance and roughness levels of haul road segments. The performance metrics may give an indication of the effectiveness of the road maintenance system 200. For example, an increased mean time between failures, decreased mean time to repair, and decreased cost per kilometer of haul vehicle operation all may indicate a robust road maintenance system.

The results 120 of the analysis could be in the form of detailed reports or they could summarize the results as a visual representation of haul road conditions such as, for example, with an interactive graph 150. The results 120 may also predict the progression of road damage, and estimate the time before the damage exceeds a preset limit. For example, the results may indicate the estimated time before a selected rating "1" road defect becomes a rating "5" road defect.

The results 120 may also include a recommended list of road repairs to be performed. For example, based on the haul vehicle diagnostic data 70, haul road monitoring data 90, haul vehicle repair data 110, and the road repair equipment schedule 105, the control system 100 may recommend that a certain defect on road segment 24 be repaired first, followed by repairs to other defects in other road segments. Triggering data 130 may be utilized in deciding the priority of the recommended road repairs.

A road management team 140 may use the results 120 to prioritize and schedule haul road defect maintenance, and issue a road maintenance request 160. In generating the road maintenance request 160, the management team 140 may use the interactive graph 150 to study the road condition statistics of different road sections and frequency of road use. In some instances, the road management team 140 may wholly or partly follow the recommended list of road repairs of the control system 100. In other cases, it may disregard these recommendations altogether. For example, knowledge of future anticipated changes in the open pit mine operation 10 may make recommendations from the control system 100 irrelevant.

In some embodiments, mine controller systems and personnel may also input information, such as payload traffic, vehicle traffic, road segment usage, etc., to control system 100. This information may be input into the control system 100 electronically or manually. The management team 140 may also input known future information relating to the open pit mine operation 10 to the control system 100. In these embodiments, the control system 100 may incorporate this forecast data into the analysis when providing recommendations. For example, a forecasted increase in use of excavation site 12 and decrease in use of excavation site 14 may increase the importance of road segment 24 and decrease the importance of road segment 28. This information may be used by control system 100 to prioritize repairs to road segment 24 higher than repairs to road segment 28.

The road maintenance request 160 may be issued directly by the management team 140, or may be automatically issued by the control system 100 with or without the approval of the management team 140. For example, if road repair equipment schedule logs are linked to the control system 100, the control system 100 may automatically schedule road maintenance in the equipment schedule logs. In some instances, previously scheduled road maintenance may be rescheduled based upon new priorities. After a defect is repaired, defect information may be updated in the control system 100.

INDUSTRIAL APPLICABILITY

The disclosed system may provide an efficient method of managing haul road maintenance. In particular, the disclosed method and system may manage haul road maintenance by analyzing data related to haul roads 22 and the haul vehicles 20 that operate on them, to determine and optimize a haul road maintenance plan.

Control system 100 may be equipped with software and hardware to acquire and analyze haul road 22 and haul vehicle 20 related data from a number of sources. The control system 100 may analyze the data to determine the impact of defects on a road segment 24, 26, 28, 29 on haul vehicles 20 and on the overall efficiency of transporting payload in the mine. The results 120 of the analysis may be used to recommend a road repair schedule. The priority of the recommended road repairs within the schedule may be based on the severity of the road defects (i.e., the defects that are causing most haul vehicle stress) or based on a financial impact of the defects (i.e., the defects that impact the performance of the mine most). Triggering data 130 may indicate the priority of the road repairs.

The haul road maintenance management system 200 thus may use monitored road condition data along with data that indicates the effect of the road condition on mine operation to determine a road maintenance schedule that decreases road maintenance cost. The computed performance metrics may also allow the system to be fine-tuned to optimize the haul road maintenance management system 200.

In addition to identifying road defects for repair, the control system 100 may recommend road repairs based upon an economic analysis. Road defects that impacts the operation or the profitability of the mine more are prioritized over road defects that are less critical. This ranking of recommended road repairs may benefit the bottom line of the mine operation by minimizing road repair costs and down time of the roads.

The control system 100 may also use road repair equipment schedule data 105 to comprehend the availability of suitable road repair equipment in the recommended road repair schedule. Since the control system 100 may be linked to the equipment schedule log, the control system 100 may also automatically schedule road repairs and reprioritize an existing schedule of the repair equipment in cases where priorities change.

It will be apparent to those skilled in the art that various modifications and variations can be made in the disclosed process and system without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A haul road maintenance management system, comprising:
   a vehicle diagnostic module located on board a haul vehicle;
   a database having historical repair data of the haul vehicle stored therein;
   a controller in communication with the vehicle diagnostic module and the database;
   analyzing, by the controller, the historical repair data of the haul vehicle and data from the vehicle diagnostic module; and
   recommending, by the controller, road maintenance in response to the analysis.

2. The system of claim 1, further including a scheduling module associated with at least one road repairing vehicle, wherein the recommendation is further based on a schedule of the at least one road repairing vehicle.

3. The system of claim 1, further including a road monitoring module located on board a road monitoring vehicle, wherein the recommendation is further based on data from the road monitoring module.

4. The system of claim 1, wherein the recommendation of road maintenance is prioritized based on the severity of the road damage.

5. The system of claim 1, further including a data logging means located in an operator cab of the haul vehicle, the data logging means configured to record an operator input relating to a road condition, wherein the recommendation is further based on the operator input.

6. The system of claim 1, wherein the vehicle diagnostic module monitors a performance of the haul vehicle and a condition of a haul road.

7. The system of claim 6, wherein the performance includes at least one of a payload weight and a speed of the haul vehicle.

8. The system of claim 6, wherein the condition includes at least a coordinate location of the haul vehicle and a grade of the haul road.

9. The system of claim 1, wherein the analysis includes an economic analysis on the cost and benefit trade-offs of a road repair.

10. The system of claim 1, wherein the analysis includes the cost of delaying a road repair.

11. The system of claim 1 wherein a result of the analysis includes a performance metric that indicates effectiveness of the haul road maintenance management system.

12. The system of claim 11, wherein the performance metric includes at least one of an average time between reported defects, an average time to repair a defect, a cost per distance of haul vehicle operation, and a cost per area of haulage road maintenance.

13. A computer-implemented method for haul road maintenance management, comprising:
    receiving vehicle performance data;
    receiving road condition data;
    receiving vehicle repair data;
    analyzing, using a processor of the computer, vehicle performance data, the road condition data, and the vehicle repair data; and
    recommending, through an output device of the computer, road maintenance based on the analysis.

14. The method of claim 13, further including receiving repair vehicle scheduling data, wherein the recommending is further based on the scheduling data.

15. The method of claim 13, further including prioritizing the recommended road maintenance based on data that indicates severe road damage.

16. The method of claim 13, further including automatically initiating a road repair based on the recommended road maintenance.

17. The method of claim 13, further including receiving worksite forecast information, wherein analysis is further based on the worksite forecast information.

18. The method of claim 13, further including generating a performance metric that indicates the effectiveness of the haul road maintenance management system.

19. A haul road maintenance management system, comprising:
    A haul truck having an onboard diagnostic module, wherein the diagnostic module monitors at least a performance of the haul truck;
    A service truck configured to monitor a haul road condition;
    A scheduling module that includes an availability of one or more road repair machines;
    A database that includes a repair history of the haul truck; and
    A control system configured to analyze at least the haul truck performance, haul road condition, the repair history, and the availability of one or more road repair machines and recommend road repairs based on the analysis.

20. The haul road maintenance management system of claim 19, wherein the analysis includes an economic analysis on the cost and benefit trade-offs of the road repairs.

* * * * *